United States Patent
Levinski et al.

(10) Patent No.: US 11,954,940 B2
(45) Date of Patent: Apr. 9, 2024

(54) METHOD AND SYSTEM FOR CHROMINANCE-BASED FACE LIVENESS DETECTION

(71) Applicant: NEC Corporation, Tokyo (JP)

(72) Inventors: Konstantin Levinski, Singapore (SG); Iskandar Goh, Singapore (SG); Tien Hiong Lee, Singapore (SG); Weng Sing Tang, Singapore (SG); Xin Qu, Singapore (SG)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/618,694

(22) PCT Filed: Jul. 17, 2020

(86) PCT No.: PCT/JP2020/028772
§ 371 (c)(1),
(2) Date: Dec. 13, 2021

(87) PCT Pub. No.: WO2021/015293
PCT Pub. Date: Jan. 28, 2021

(65) Prior Publication Data
US 2022/0245964 A1    Aug. 4, 2022

(30) Foreign Application Priority Data
Jul. 19, 2019   (SG) .......................... 10201906721S (51) Int. Cl.
*G06K 9/20* (2006.01)
*G06K 9/62* (2022.01)
(Continued)

(52) U.S. Cl.
CPC .......... *G06V 40/166* (2022.01); *G06V 10/141* (2022.01); *G06V 40/172* (2022.01); *G06V 40/45* (2022.01)

(58) Field of Classification Search
CPC ................ G06V 40/16–40/179; G06V 10/141
See application file for complete search history.

(56) References Cited

U.S. PATENT DOCUMENTS 5,550,928 A * 8/1996 Lu .................... H04N 21/42201
382/116
2006/0093183 A1   5/2006 Hosoi
(Continued)

FOREIGN PATENT DOCUMENTS

| | | |
|---|---|---|
| CN | 108629260 A | 10/2018 |
| JP | 2006-259925 A | 9/2006 |

OTHER PUBLICATIONS

International Search Report of PCT Application No. PCT/JP2020/028772 dated Oct. 13, 2020.
(Continued)

*Primary Examiner* — Brian Werner
(74) *Attorney, Agent, or Firm* — Sughrue Mion, PLLC (57) ABSTRACT

Methods, systems and computer readable medium for liveness detection authentication of a facial image are provided. The method includes acquiring a first image of the facial image illuminated with a first color, acquiring a second image of the facial image illuminated with a second color, and determining if the facial image is consistent with a three-dimensional (3D) structure in response to a combination of the first and second images. The method further includes authenticating the facial image if the facial image is consistent with a 3D structure and the facial image matches a face of user to be authenticated.

24 Claims, 6 Drawing Sheets

(51) Int. Cl.
 *G06V 10/141* (2022.01)
 *G06V 40/16* (2022.01)
 *G06V 40/40* (2022.01)

(56) References Cited

U.S. PATENT DOCUMENTS

| | | |
|---|---|---|
| 2006/0212718 A1 | 9/2006 | Senga |
| 2013/0015946 A1* | 1/2013 | Lau ..................... G06V 40/172 |
| | | 340/5.2 |
| 2014/0016837 A1 | 1/2014 | Nechyba et al. |
| 2015/0324629 A1 | 11/2015 | Kim et al. |
| 2016/0371555 A1 | 12/2016 | Derakhshani et al. |
| 2017/0017834 A1 | 1/2017 | Sabitov et al. |
| 2017/0323167 A1 | 11/2017 | Mapen et al. |
| 2018/0096212 A1 | 4/2018 | Lin |
| 2018/0173980 A1 | 6/2018 | Fan et al. |
| 2018/0336397 A1* | 11/2018 | Smith .................... G06V 40/16 |
| 2019/0102872 A1* | 4/2019 | Moussa .................... G06T 7/30 |
| 2019/0110198 A1 | 4/2019 | LeCun et al. |
| 2020/0201967 A1* | 6/2020 | Maxwell ............. H04L 63/0861 |

OTHER PUBLICATIONS

Written opinion for PCT Application No. PCT/JP2020/028772 dated Oct. 13, 2020.
Extended European Search Report for EP Application No. 20843558.6, dated Aug. 29, 2022.
Japanese Office Action for JP Application No. 2022-530006, dated Oct. 25, 2022 with English Translation.
Singapore Office Action for Singapore Application No. 10201906721S, mailed on Sep. 9, 2022.

\* cited by examiner

METHOD AND SYSTEM FOR CHROMINANCE-BASED FACE LIVENESS DETECTION

This application is a National Stage Entry of PCT/JP2020/028772 filed on Jul. 17, 2020, which claims priority from Singapore Patent Application 10201906721S filed on Jul. 19, 2019, the contents of all of which are incorporated herein by reference, in their entirety.

TECHNICAL FIELD

Example embodiments generally relate to facial recognition, and more particularly relate to methods and systems for chrominance-based face liveness detection.

BACKGROUND OF THE DISCLOSURE

With more and more crucial services becoming ubiquitously accessible, it becomes necessary to provide efficient methods and systems to secure access to such services. Unfortunately, the traditional username/password approach is losing its ability to provide secure authentication due to mass adoption by less tech-savvy population who typically utilize unsecure or repeated passwords.

Face authentication technology has become a popular way to provide reliable user authentication for gaining access to one's private data and services without the hassle of password management. Due to a higher degree of user convenience and increased security that face authentication provides as compared to traditional forms of authentication, it is not surprising that facial recognition will see increased usage on mobile phones and other portable internet-enabled and data storage devices, such as pads and laptops. Such usage will include login to a users' most important accounts and services on their mobile phones before any confidential and sensitive content can become accessible.

The growing popularity of facial recognition technology and its application as an authentication method to secure sensitive information stored on a users' mobile phones comes with new challenges in security. In the same way as passwords and PINs can be stolen and compromised, a person's facial image can also be stolen. For example, an attacker can masquerade as an authorized user by falsifying the face biometric data of the targeted person. Face spoofing is straightforward and requires no special skills; one can simply download a high-quality photograph of the targeted person from social websites, print the photograph of the targeted person on paper, and present the printed photograph of the targeted person in front of the front-facing camera of the mobile phone during the authentication process.

It is, therefore, of paramount importance to incorporate an effective liveness detection mechanism in facial recognition authentication systems to ensure their security. Facial recognition algorithms fortified with liveness detection techniques introduce another layer of defense against face spoofing and collectively make it harder to trick the face recognition authentication system. However, most conventional liveness schemes are not robust enough and, thus, can still be tricked and/or bypassed with little effort.

A typical approach to liveness detection depends on challenge-response methodology where the user is asked to perform some action to be detected by the algorithm to provide proof that a real user, not a recording, is detected. Such requests, however, cause inconvenience to the end user and still do not provide accurate results, as users take some time to response and the response might not be exactly as expected.

In addition, it is possible to simulate face movements with specialized software. Or, alternatively, an attacker can masquerade as the authorized user by presenting an acquired video of the authorized user on a high resolution screen of a laptop and then replaying the recorded video in front of the front-facing camera of a mobile phone to gain illegitimate access to the user's accounts and services. Such replay attacks can be easily carried out using videos of the authorized user obtained from social networking services such as Facebook, Twitter and Instagram.

Thus, what is needed is methods and systems for liveness detection which ascertains real presence of an authorized user that is reliable and capable of effectively countering a plethora of face spoofing techniques. Furthermore, other desirable features and characteristics will become apparent from the subsequent detailed description and the appended claims, taken in conjunction with the accompanying drawings and this background of the disclosure.

SUMMARY

According to at least one example embodiment, a method for liveness detection authentication of a facial image is provided. The method includes acquiring a first image of the facial image illuminated with a first color, acquiring a second image of the facial image illuminated with a second color, and determining if the facial image is consistent with a three-dimensional (3D) structure in response to a combination of the first and second images. The method further includes authenticating the facial image if the facial image is consistent with a 3D structure and the facial image matches a face of a user to be authenticated.

According to another example embodiment, a system in a device for liveness detection authentication of a facial image is provided. The system includes a multi-color illumination device, a camera and a processor. The multi-color illumination device provides illumination in a first direction and the camera acquires images in at least the first direction. The processor is coupled to the multi-color illumination device and the camera and records a first image from the camera when the multi-color illumination device illuminates the facial image with a first color and records a second image from the camera when the multi-color illumination device illuminates the facial image with a second color. The processor analyzes a combination of the first and second images to determine if the facial image is consistent with a three-dimensional (3D) structure in response to the combination of the first and second images and authenticates the facial image if the facial image is consistent with a 3D structure and the facial image matches a face of a user to be authenticated.

And according to yet another example embodiment, a computer readable medium for performing liveness detection authentication of a facial image is provided. The computer readable medium has instructions stored thereon for a processing means to acquire a first image of the facial image illuminated with a first color, acquire a second image of the facial image illuminated with a second color, determine if the facial image is consistent with a three-dimensional (3D) structure in response to a combination of the first and second images, and authenticate the facial image if the facial image is consistent with a 3D structure and the facial image matches a face of a user to be authenticated.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various example embodiments and to explain various principles and advantages in accordance with a present example embodiment.

FIGS. 3A, 3B and 3C depict side planar views of operation of the system for liveness detection in accordance with the present example embodiments.

FIGS. 6A and 6B, depict vectors perpendicular to the surface, to demonstrate how the relation depicted in FIG. 5 would cause dramatic difference in pattern of reflection between a facial image of a flat two-dimensional (2D) object and a three-dimensional (3D) object. FIG. 6A depicts perpendicular vectors for a 3D object such as a face and FIG. 6B depicts perpendicular vectors for a flat 2D surface.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of the present example embodiments to present methods and systems for a liveness detection mechanism utilizing automatic challenge-response to ascertain the real presence of the authorized user and deliver a high assurance and reliable solution that is capable of effectively countering a plethora of face spoofing techniques. The proposed mechanism, despite incorporating challenge-response elements, does not require a user to perform any actions, while still providing high degree of reliability.

The present example embodiments use properties of light to deliver an easy to use and a highly robust anti-spoofing solution. In accordance with the present example embodiments, at least two different color channels are used for illumination of a facial image, a first color and a second color. While blue and orange are used in the systems and methods in accordance with present example embodiments, the example embodiments are not restricted to these colors and different colors can be used instead. In addition, while two colors are used, the method is not limited to two colors and can use three or four or more colors. In addition, the methods and systems of the present example embodiments is not limited to a single set of two image captures and multiple sets of two image captures may be used in accordance with the present example embodiments. When a facial image (i.e., something presented to a camera of a mobile device, such as a mobile phone, for authentication including a real person's face or a photo or a video or some other image), the two distinct light stimuli are generated on a screen of the mobile device and the front camera of the mobile device (i.e., the camera facing in a same direction as the light stimuli or illumination) to capture two different images formed as a result of illumination from the display reflected from the facial image to determine if the facial image is a face of a user. The two images are then processed and analyzed by a set of algorithms.

The set of algorithms computes the amount of each color channel on every pixel of each image and performs pixel value comparison per pixel between the two images captured. Finally, for each pixel of the image, the resultant pixel component from illumination is computed. The result is a matrix of pixel component values which is used by the liveness detection engine to determine if the face is real or a spoof. The liveness detection engine analyzes different regions of interest in the captured face. Images that are captured from two-dimensional (2D) photos and videos exhibit a different pattern from three-dimensional (3D) images that are captured from a real facial image. The liveness detection engine classifies images based on the differences between 2D images and 3D images and determines if the facial image is consistent with a 3D structure in response to the first and second images.

Figure 1:
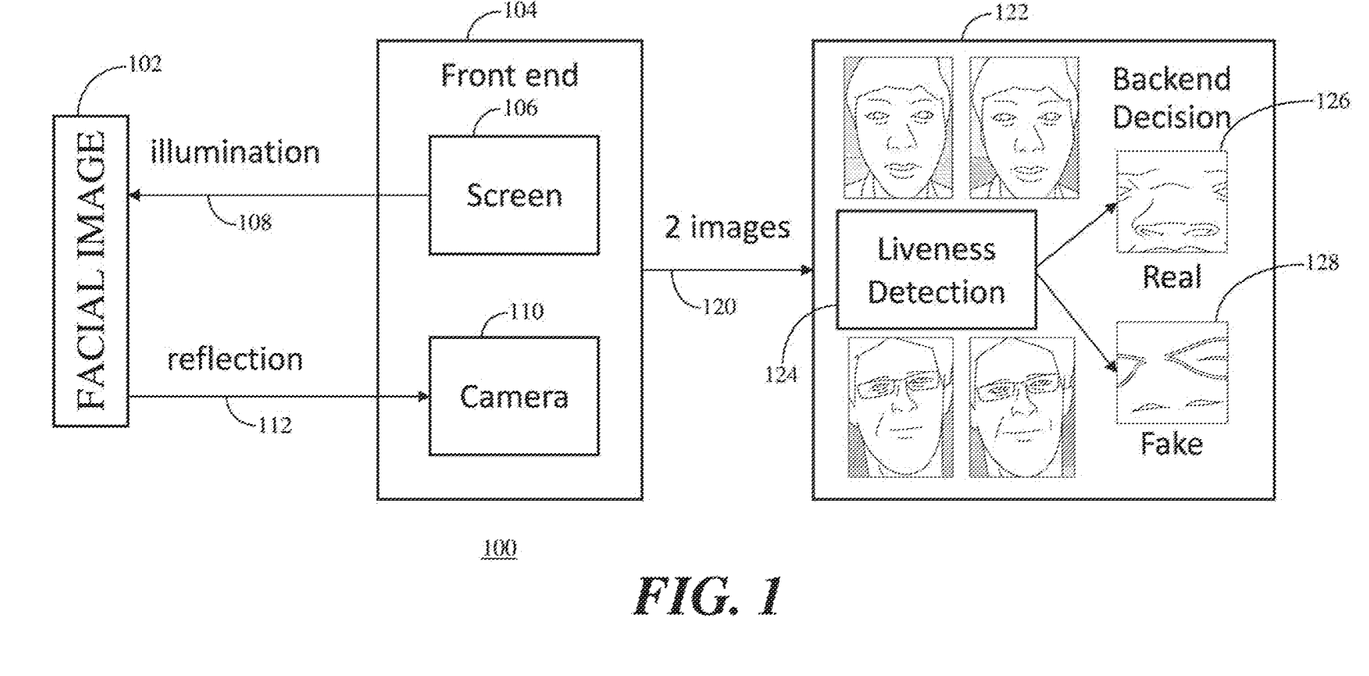
FIG. 1 depicts a high-level block diagram of a system for liveness detection in accordance with present example embodiments.

Referring to FIG. 1, a block diagram 100 depicts a high-level view of a system for liveness detection of a facial image 102 in accordance with the present example embodiments. A mobile phone 104 or similar device includes a multi-color illumination device 106, such as a color display screen of the mobile phone 104, which provides illumination 108 in a first direction. The mobile phone 104 also includes a camera 110 which can acquire an image in the same direction by receiving reflection 112 from the facial image 102.

The two images are provided 120 to a processor 122. A liveness detection engine 124 analyzes the two images to determine if the facial image 102 is real 126 or fake 128 by determining if 3D structures are present.

Liveness detection has to take place in conditions and in directions where changing amount of light emitted from the device's display (e.g., the multi-color illumination device 106) is detectable by the device's camera 110. Before liveness detection can take place, the face location and illumination parameters are analyzed and the user is advised to make sure conditions for successful liveliness detection are met. As illumination is proportional to squared distance to the light source, it is important to bring the user as close to the illumination device 106 as the camera 110 allows.

Figure 2:
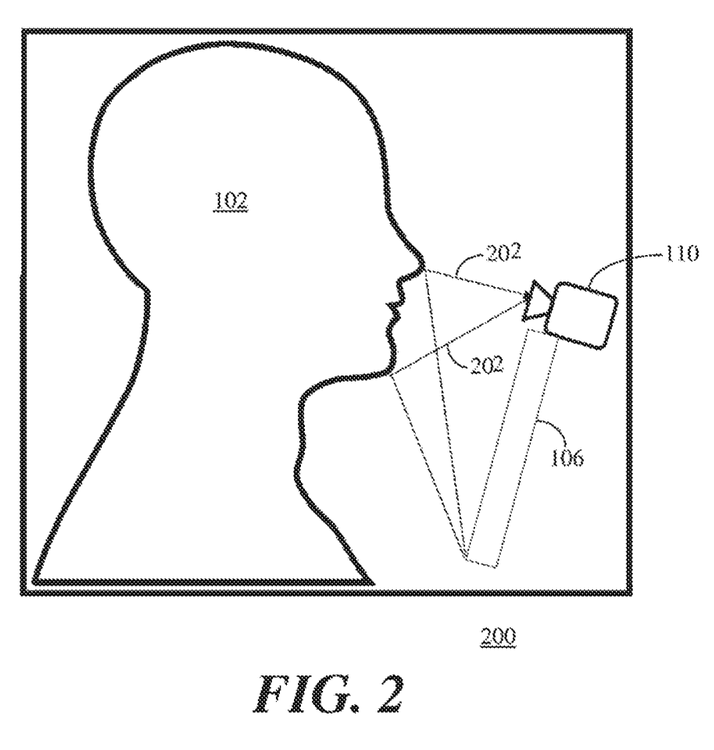
FIG. 2 depicts a side planar view of an optimal camera-user arrangement for the system for liveness detection in accordance with the present example embodiments.

It is preferred to capture as much information about the 3D scene as possible. This information is obtained by analyzing reflections of illumination of the mobile device's screen (e.g., illumination device 106) from the user's face 102. The more light reflected, as opposed to diffused, the more information on 3D components of the scene is available. To maximize the reflection component of display light reaching the camera 110, it is advantageous to position the camera 110 lower as shown in FIG. 2, so that the reflective component in the light from the screen is maximized. FIG. 2 depicts a side planar view 200 of the 3D facial image 102 of a user. The reflection component 202 of the illumination from the screen/display 106 is optimized by positioning both the illumination device 106 and the camera 110 low. Note that this positioning does not have to present additional hassle to the user, as the positioning can be achieved with common guidance like 'position your face on the camera'.

For the majority of face authorization applications, the position of the camera 110 is guided by some sort of marker, most commonly a direct image of the user captured by the camera 110. This process is familiar to users and does not require additional training. This familiarity with the process is leveraged to guide a user in such a way as to bring the phone into the best position for liveness checking.

Figure 3A:
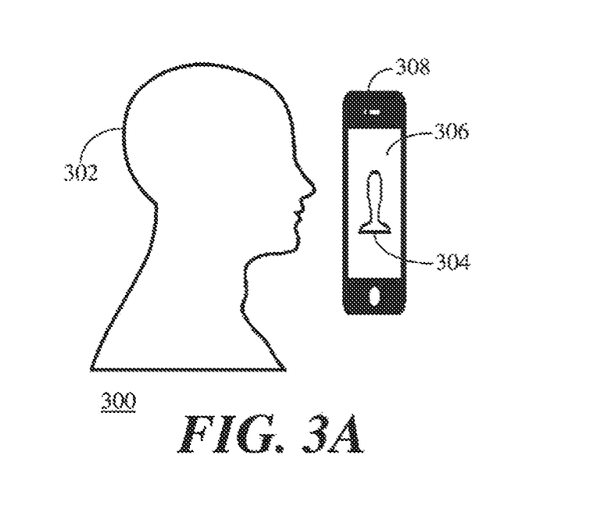
FIG. 3A depicts traditional mobile phone camera positioning and FIGS. 3B and 3C depict artificially shifting a reference marker on a mobile phone screen in accordance with the present example embodiments.
Figure 3B:
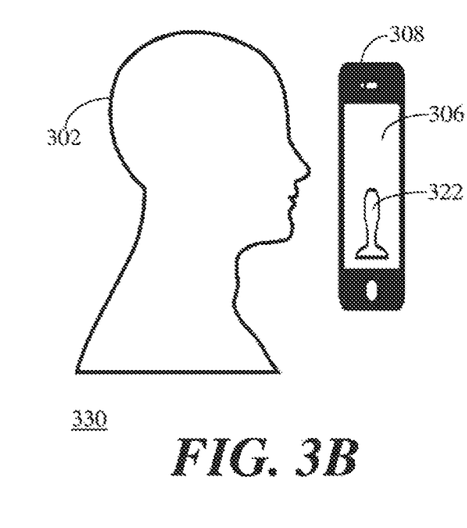
Figure 3C:
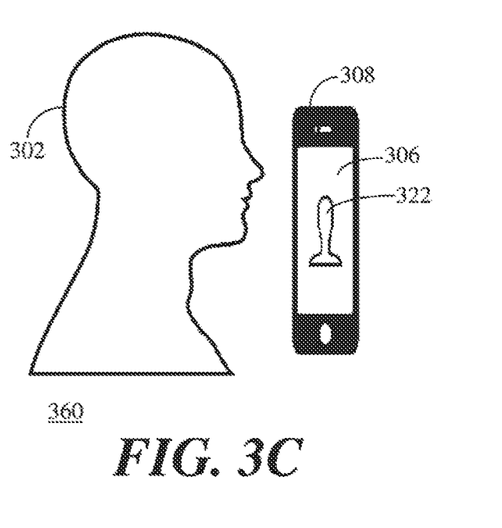

Referring to FIG. 3A, a side planar view 300 depicts traditional positioning of a user 302 in relation to a captured image 304 on a screen 306 of a mobile phone 308. Typically, the user 302 will move the mobile phone 308 until the captured image 304 is centered on the screen 306. Thus, the captured image 304 can act as a marker for adjustment of the position of the mobile phone 308. Referring to FIGS. 3B and 3C, side planar views 330, 360 depict operation of the system for liveness detection in accordance with the present example embodiments. As indicated, the optimal position for liveness checking is low. In accordance with the present example embodiments, artificially shifting a reference marker 322 (e.g., the captured image 304 of the user 302) lower causes the user to move the mobile phone 308 lower without any additional instructions. The view 330 depicts the reference marker 322 on the screen 306. The fact that the reference marker 322 is low on the screen indicates to the user 302 to lower the mobile phone. It has been determined that the shift of the reference marker 322 (i.e., the captured image 304 of the user 302) naturally causes users to position the mobile phone 304 lower without any additional guidance as the user 302 will shift the mobile phone 308 to keep the reference marker 322 centered on the screen 306. Referring to the view 360, as the user 302 shifts the mobile phone 308 lower, the reference marker 322 position on the screen is shifted higher so that when the user 302 has centered the reference marker 322 on the screen, the mobile phone 308 will be in an optimal position in relation to the user 302 for liveness detection in accordance with the present example embodiments.

Once the user is in the correct lighting position in respect to the mobile phone, the liveness detection process begins. The user is advised to reduce movements during the two-second liveness detection process. Meanwhile, the mobile phone screen illumination changes its color, causing the image received by the camera to change as well. Screen illumination change allows determination of which part of the light emitted by the screen got into camera, effectively collecting information on the 3D structure of the scene. The illumination change is timed randomly to further diminish attacker chances to generating a response. Changes in the illumination are gradual, to avoid making the user uncomfortable or triggering a medical condition, such as epilepsy.

To get 3D components of a scene, it is necessary to have information of the relative position of the illumination device and the camera. As will be discussed in detail below, it is possible to filter out illumination that is not originating at the screen to effectively provide control of the illumination device. By controlling the illumination device, the proportion of reflective component in the resulting image is increased, thereby reducing the effect of subject pigmentation and solely focusing on the spatial features.

Changing illumination of the screen causes changes in the image observed by the camera. Illumination from the screen can be expressed as set out in Equation (1):

$$I_{screen}(r, t) = R_{screen}(r, t), G_{screen}(r, t), B_{screen}(r, t) \quad (1)$$

where r is the position on the screen and t is time. The light emitted from the screen is reflected from the environment, and part of the reflected light is detected by the mobile device camera as shown in Equation (2);

$$I_{reflected}(r_c, t) = R_{reflected}(r_c, t), G_{reflected}(r_c, t), B_{reflected}(r_c, t) \quad (2)$$

where $r_c$ is the position of the corresponding pixel on camera. The camera takes the reflected light in combination with the $I_{ambient}$. And the phone camera records images as the screen illumination changes.

Those skilled in the art would be tempted to analyze $I_{reflected}(r_c,t)$ as a function $F(G_{scene}, I_{screen}(r,t))$, where $G_{scene}$ is a 3D structure of the scene. Instead of tracking changes in $R_{reflected}(r_c,t), G_{reflected}(r_c,t), B_{reflected}(r_c,t)$ directly, in accordance with the present example embodiments, the chrominance of the screen highlight is varied as much as possible between the first color and the second color. This allows detection of the light that comes from the screen by tracking changes in chrominance only, ignoring luminance and making detection robust to ambient illumination intensity changes.

Figure 4:
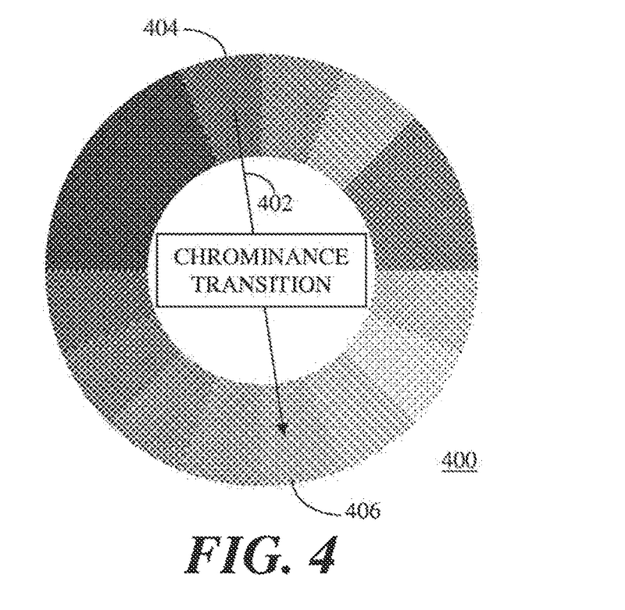
FIG. 4 depicts a color wheel showing optimal chrominance transition for use in the system for liveness detection in accordance with the present example embodiments.

As discussed above, blue and orange illumination was used for verification of the liveness detection in accordance with the present example embodiments. Referring to FIG. 4, a color wheel 400 is depicted showing that the chrominance transition 402 from blue 404 to orange 406 maximizes chrominance differential. While blue and orange are used in the systems and methods in accordance with present example embodiments, the present example embodiments are not restricted to these colors and different colors can be used instead with recognition that maximizing the chrominance differential by choosing two colors which are significantly separated on the color wheel 400 improves the liveness detection.

The portion of the light registered at the camera which originates from the screen is detected. This is done by arranging colors for $I_{screen}$ in the beginning (i.e., the first color) and end (i.e., the second color) of the illumination process in such a way as to maximize chrominance differential. The differential will cause the chrominance of $I_{reflected}(r_c,t)$ to shift in accordance with the screen illumination.

For each pixel of the camera image, a correlation in chrominance change with the time is detected. At a minimum, two images are required to detect change in chrominance in the detected light reflected from the user. This change in chrominance can be calculated in accordance with Equation (3):

$$L(r_c) = |C(r_c, 0) - C(r_c, T)| \quad (3)$$

where C(r,t) is the chrominance value at time moment t at location r and L represents the part of the light that reached camera from the screen.

It is also possible to take a full video of the illumination process, making detection more robust, but at the cost of higher bandwidth requirements. Detection of the liveness can be done on the device or in the background, depending on the requirements of the detection process, performance of the user's device and the available bandwidth.

Figure 5:
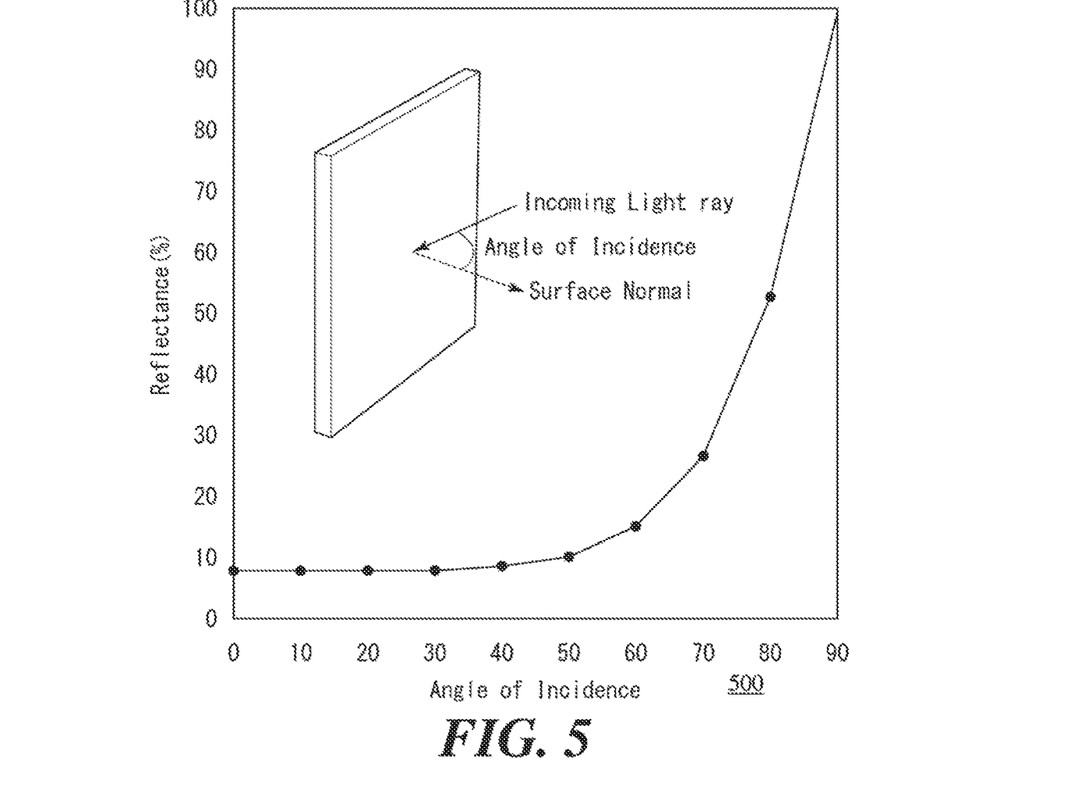
FIG. 5 depicts a graph of surface reflectance as related to angle of incidence.

Referring to FIG. 5, a graph 500 depicts surface reflection as related to reflection angle of incidence. $L(r_c)$ (Equation (3)) is a measure of the light propagation from the display to the camera. From the graph 500, it can be seen that more light is reflected when its angle of incidence is big (i.e., more light is reflected the more parallel the incoming light ray is to the surface). This is important in the present example embodiments as the common and strong dependence between the amount of reflected light and the incidence angle as shown in the graph 500 amplifies the 3D component of the environment.

Figure 6A:
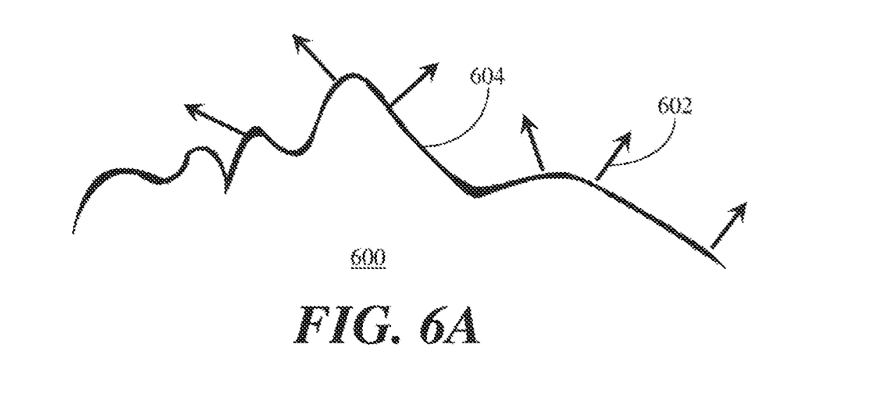
Figure 6B:
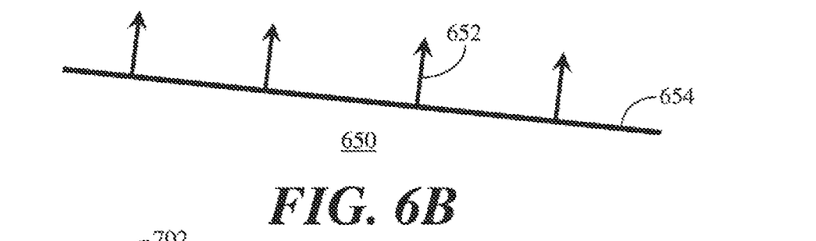

Referring to FIGS. 6A and 6B, side planar views 600, 650 depict vectors 602, 652 normal (i.e., perpendicular) to surfaces 604, 654, to demonstrate how the relation between the amount of reflected light and the incidence angle as shown in the graph 500 would cause dramatic differences in patterns of reflection between a facial image of a flat two-dimensional (2D) object and a 3D object. More particularly, the view 600 depicts light 602 perpendicularly reflected off various positions of a three-dimensional object 604 such as a face and the view 650 depicts light 652 reflected perpendicularly off a flat surface 654. If the camera is looking at the 3D object 604, such as human face, its normal would rapidly change in synchronization with the actual image. In a spoofing attempt, the camera is usually confronted with a curved or flat surface 654 wherein changes in the normal has nothing to do with the image it purports to be. Thus, the difference between the vectors 602 and the vectors 652 demonstrate how normals vary between real 3D scenes and fake 2D scenes. This difference in normals cause dramatic differences in reflected light patterns per the relationship shown in the graph 500 (FIG. 5).

Figure 7:
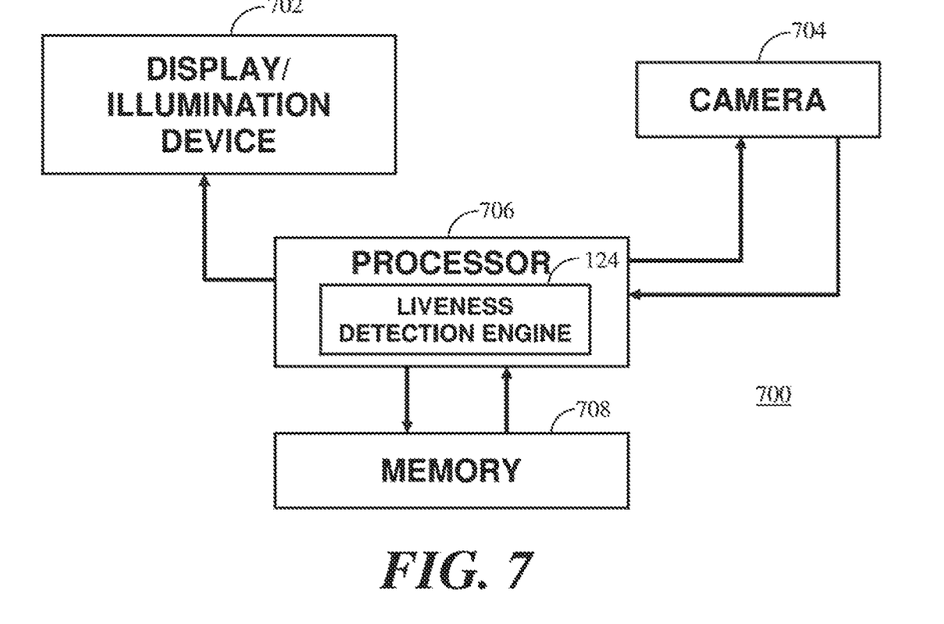
FIG. 7 depicts a block diagram of a device having a system for liveness detection in accordance with the present example embodiments.

Referring to FIG. 7, a block diagram 700 depicts a device having a system for liveness detection in accordance with the present example embodiments. The system includes a multi-color illumination device 702, a camera 704 and a processor 706. The multi-color illumination device 702 provides illumination in a first direction and the camera 704 acquires images in at least the first direction. The processor 706 is coupled to the multi-color illumination device 702 and the camera 704 and records a first image from the camera 704 when the multi-color illumination device 702 illuminates a face with a first color and records a second image from the camera 704 when the multi-color illumination device 702 illuminates the face with a second color. The liveness detection engine 124 in the processor 706 analyzes a combination of the first and second images to determine if the facial image is consistent with a 3D structure in response to the first and second images and authenticates the facial image if the facial image is consistent with a 3D structure and the facial image matches a user to be authenticated.

A memory 708 is coupled to the processor 706 to store a facial image of the user for the authentication. It is important to use the same image that was used in illumination detection for any authentication matching to the stored facial image that happens in conjunction with liveness detection. This is required to prevent an attacker from using some unrelated person for liveness testing, followed by presenting photo for detection.

Figure 8:
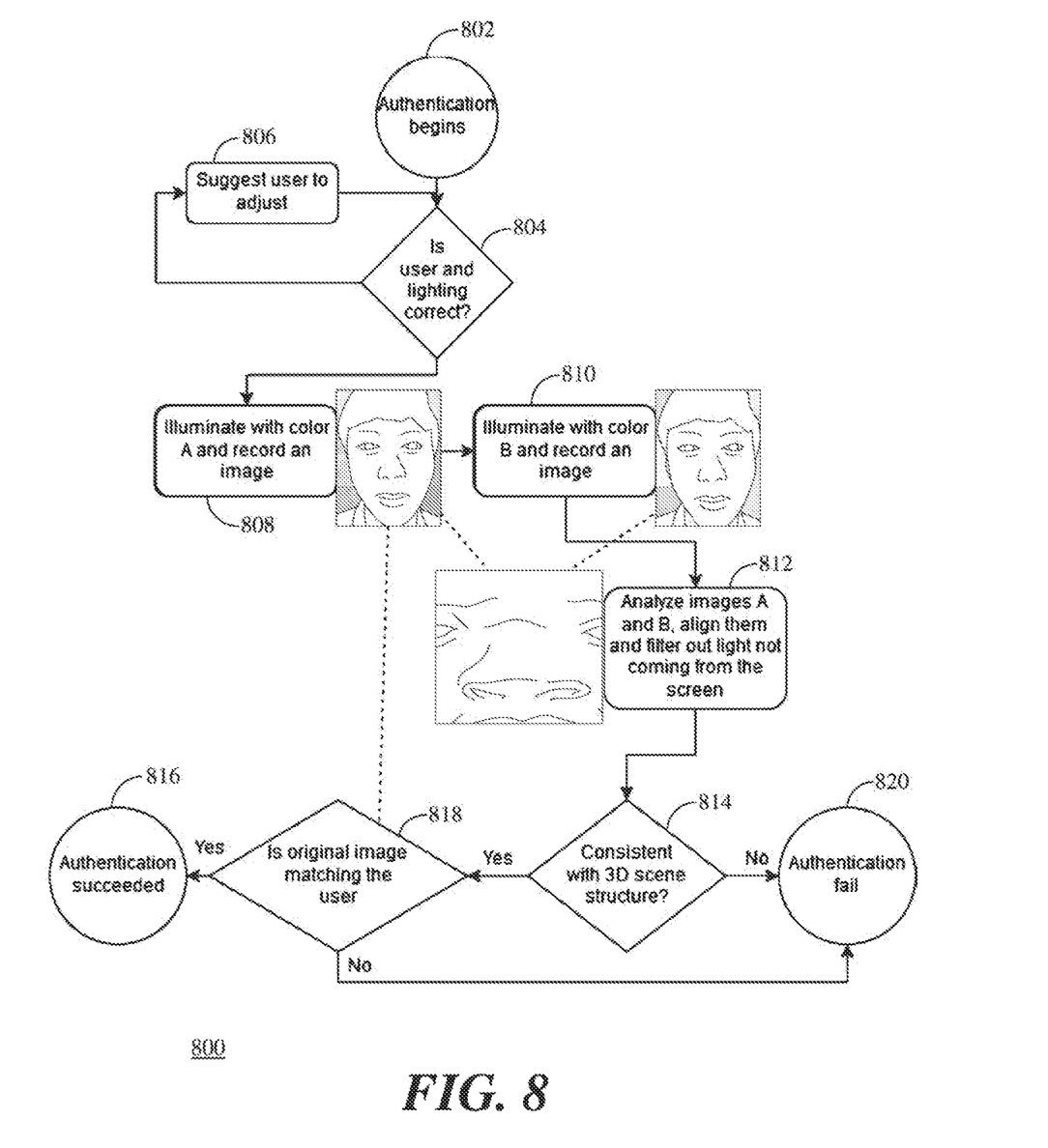
FIG. 8 depicts a method for liveness detection in accordance with the present example embodiments.

Referring to FIG. 8, a flowchart 800 depicts a method for liveness detection authentication of a facial image presented to a mobile device such as a mobile phone and authentication. After the authentication process begins 802, the method determines whether the user and the lighting are correct 804. If it is determined that the user and the lighting are not correct 804, the user is suggested 806 to adjust a position of the camera. Once the user and the lighting are correct 804, a first image of the facial image illuminated with a first color is acquired 808 and a second image of the facial image illuminated with a second color is acquired 810. A combination of the first and second images are analyzed 812 by aligning the two images and filtering out the light not coming from the illumination device as described hereinabove to determine 814 if the facial image is consistent with a 3D structure. The method further includes authenticating 816 the facial image if the facial image is consistent with a 3D structure 814 and the facial image matches 818 a user to be authenticated. If either the facial image is not consistent with a 3D structure 814 or the facial image does not match 818 the user to be authenticated, the authentication fails 820.

Most active liveness detection techniques require additional interaction of the user with the mobile application, where the user is needed to perform some voluntary challenge-response actions that are completely controllable by the user. The user will be presented with a challenge, and he will have to respond to the challenge by performing some voluntarily controlled actions such as blinking of his eyes, smiling, nodding his head, or even moving the mobile device in a correct direction (e.g. back and forth, sideways) and in a random pattern to ascertain liveness at the point of capture. However, such voluntary actions by the user is unnatural and the user often finds it difficult to use. Therefore, it is critical that the liveness detection solution must have a correct balance between security and convenience; it must be easy to use and provide strong liveness detection.

Thus, it can be seen that the present example embodiments provide methods and systems for liveness detection which leverage on properties of light to deliver an easy to use and highly robust anti-spoofing solution. A light stimulus from the screen of a mobile device is projected onto the facial image and the system analyzes regions in the captured image for reflected light. The reflected light is an involuntary response which forms a distinguishable pattern based on predetermined biometric characteristics of the facial image. The present example embodiments precisely distinguish a real or spoof face by analyzing the regions of interest in the captured face for a unique pattern formed by light reflected from the subject to determine whether the detected pattern is consistent with a 3D structure. Furthermore, the response from the user is natural, involuntary and does not require control; the user does not even know that he is responding to a challenge and the user experience is both seamless and transparent to the user. The present example embodiments deliver a high assurance and reliable solution that is capable of effectively countering a plethora of face spoofing techniques.

While example embodiments have been presented in the foregoing detailed description of the invention, it should be appreciated that a vast number of variations exist. It should further be appreciated that the example embodiments are only examples, and are not intended to limit the scope, applicability, operation, or configuration of the invention in any way. Rather, the foregoing detailed description will provide those skilled in the art with a convenient road map for implementing an example embodiment of the invention, it being understood that various changes may be made in the function and arrangement of steps and method of operation described in the example embodiment without departing from the scope of the invention as set forth in the appended claims.

The exemplary embodiments described above may also be described entirely or in part by the following supplementary notes, without being limited to the following.

(Supplementary Note 1)

A method for liveness detection authentication of a facial image comprising:
- acquiring a first image of the facial image illuminated with a first color;
- acquiring a second image of the facial image illuminated with a second color;
- determining if the facial image is consistent with a three-dimensional (3D) structure in response to a combination of the first and second images; and
- authenticating the facial image if the facial image is consistent with a 3D structure and the facial image matches a face of a user to be authenticated.

(Supplementary Note 2)

The method in accordance with Supplementary Note 1 wherein the first color has a first chrominance value and the second color has a second chrominance values.

(Supplementary Note 3)

The method in accordance with Supplementary Note 2 wherein the first and second chrominance values are selected to maximize a chrominance differential.

(Supplementary Note 4)

The method in accordance with any one of Supplementary Notes 1 to 3 wherein a time that the facial image is illuminated with the first color and a time that the facial image is illuminated with the second color are randomly selected.

(Supplementary Note 5)

The method in accordance with any one of Supplementary Notes 1 to 4 further comprising before the acquiring the first image the step of suggesting the user to adjust position of the camera in response to determining that the facial image and the lighting are not correct.

(Supplementary Note 6)

The method in accordance with any one of Supplementary Notes 1 to 7 wherein determining the facial image is consistent with a 3D structure comprises:
- aligning the first image and the second image; and
- determining if the facial image is consistent with a 3D structure in response to a combination of the aligned first and second images.

(Supplementary Note 7)

The method in accordance with Supplementary Note 6 wherein determining the facial image is consistent with a 3D structure further comprises filtering light from the first image which is not illumination of the first color.

(Supplementary Note 8)

The method in accordance with either Supplementary Note 6 or Supplementary Note 7 wherein determining the facial image is consistent with a 3D structure further comprises filtering light from the second image which is not illumination of the second color.

(Supplementary Note 9)

The method in accordance with any one of Supplementary Notes 1 to 8 wherein the acquiring the first image and the acquiring the second image comprise acquiring a first set of images, the first set of images comprising the first image and the second image, the method further comprising acquiring at least a further set of images including:
- acquiring a first one of the further set of images of the facial image illuminated with a third color different from the first and second colors; and
- acquiring a second one of the further set of images of the facial image illuminated with a fourth color, wherein the fourth color is different from the first, second and third colors, and wherein the third color and the fourth color are selected in response to chrominance differential between a chrominance value of the third color and a chrominance value of the fourth color, and
- wherein the determining if the facial image is consistent with a 3D structure comprises determining if the facial image is consistent with a 3D structure in response to a combination of the first, second, third and fourth images.

(Supplementary Note 10)

A system in a device for liveness detection authentication of a facial image, the system comprising:
- a multi-color illumination device for providing illumination in a first direction;
- a camera for acquiring images in at least the first direction; and
- a processor coupled to the multi-color illumination device and the camera, the processor recording a first image from the camera when the multi-color illumination device illuminates the facial image with a first color and recording a second image from the camera when the multi-color illumination device illuminates the facial image with a second color, the processor analyzing a combination of the first and second images to determine if the facial image is consistent with a three-dimensional (3D) structure in response to a combination of the first and second images and authenticating the facial image if the facial image is consistent with a 3D structure and the facial image matches a face of a user to be authenticated.

(Supplementary Note 11)

The system in accordance with Supplementary Note 10 further comprising a memory for storing data, wherein the stored data comprises a stored image of the user to be authenticated, and wherein the processor determines the facial image matches the user to be authenticated by comparing the combination of the first or the second image to the stored image of the user to be authenticated.

(Supplementary Note 12)

The system in accordance with Supplementary Note 11 wherein the processor controls the multi-color illumination device to illuminate the face with the first color and the second color in response to selecting the first and second colors to maximize a chrominance differential between chrominance values of the first and second colors.

(Supplementary Note 13)

The system in accordance with any one of Supplementary Notes 10 to 12 wherein the processor controls the multi-color illumination device to illuminate the face with the first color for a first time and controls the multi-color illumination device to illuminate the face with the second color for a second time, wherein the first time and the second time a randomly chosen by the processor.

(Supplementary Note 14)

The system in accordance with any one of Supplementary Notes 10 to 13 wherein the multi-color illumination device comprises a display and wherein the processor provides reference marker information to the display to suggest the user adjust a position of the camera before the acquiring the first image in response to determining that the facial image and the lighting are not correct.

(Supplementary Note 15)

The system in accordance with Supplementary Note 14 wherein the reference marker information comprises an image of the user.

(Supplementary Note 16)

The system in accordance with either Supplementary Note 14 or Supplementary Note 15 wherein the processor moves the reference marker information on the display to suggest the user adjust a position of the camera by maintaining a position of the reference marker substantially in a center of the display.

(Supplementary Note 17)

The system in accordance with any one of Supplementary Notes 10 to 16 wherein the processor determines the facial image is consistent with a 3D structure by aligning the first image and the second image and determining if the facial image is consistent with a 3D structure in response to a combination of the aligned first and second images.

(Supplementary Note 18)

The system in accordance with Supplementary Note 17 wherein determining the facial image is consistent with a 3D structure further comprises filtering light from the first image which is not illumination of the first color.

(Supplementary Note 19)

The system in accordance with either Supplementary Note 17 or Supplementary Note 18 wherein determining the facial image is consistent with a 3D structure further comprises filtering light from the second image which is not illumination of the second color.

(Supplementary Note 20)

The system in accordance with any one of Supplementary Notes 10 to 19 wherein the device comprises a mobile phone.

(Supplementary Note 21)

Computer readable media for performing liveness detection authentication of a facial image, the computer readable medium storing instructions for a processing means to
acquire a first image of the facial image illuminated with a first color;
acquire a second image of the facial image illuminated with a second color;
determine if the facial image is consistent with a three-dimensional (3D) structure in response to a combination of the first and second images; and
authenticate the facial image if the facial image is consistent with a 3D structure and the facial image matches a face of a user to be authenticated.

(Supplementary Note 22)

The computer readable medium in accordance with Supplementary Note 21 further storing instructions for the processing means to provide visual instructions to suggest the user to adjust position of the camera before acquiring the first image in response to determining that the facial image and the lighting are not correct.

(Supplementary Note 23)

The computer readable medium in accordance with either Supplementary Note 21 or Supplementary Note 22 further storing instructions for the processing means to determine the facial image is consistent with a 3D structure in response to aligning the first image and the second image.

(Supplementary Note 24)

The computer readable medium in accordance with any one of Supplementary Note 21 to 23 further storing instructions for the processing means to determine the facial image is consistent with a 3D structure in response to filtering light from the first image which is not illumination of the first color.

(Supplementary Note 25)

The computer readable medium in accordance with any one of Supplementary Notes 21 to 24 wherein determining the facial image is consistent with a 3D structure further comprises filtering light from the second image which is not illumination of the second color.

This application is based upon and claims the benefit of priority from Singapore Patent Application No. 10201906721S, filed Jul. 19, 2019, the disclosure of which is incorporated herein in its entirety.

The invention claimed is:

1. A method for liveness detection authentication of a facial image comprising:
acquiring a first image of the facial image illuminated with a first color;
acquiring a second image of the facial image illuminated with a second color;
determining if the facial image is consistent with a three-dimensional (3D) structure in response to a combination of the first and second images
determining if the facial image matches a user to be authenticated by comparing a combination of the first and second images to an image of the user to be authenticated, the image of the user to be authenticated being stored in a memory; and
authenticating the facial image if the facial image is consistent with the 3D structure and the facial image matches a face of the user to be authenticated.

2. The method in accordance with claim 1 wherein the first color has a first chrominance value and the second color has a second chrominance value.

3. The method in accordance with claim 2 wherein the first and second chrominance values are selected to maximize a chrominance differential.

4. The method in accordance with claim 1 wherein a time that the facial image is illuminated with the first color and a time that the facial image is illuminated with the second color are randomly selected.

5. The method in accordance with claim 1 further comprising, before the acquiring the first image, suggesting the user to adjust position of the camera in response to determining that the facial image and the lighting are not correct.

6. The method in accordance with claim 1 wherein the determining if the facial image is consistent with a 3D structure comprises:
aligning the first image and the second image; and
determining if the facial image is consistent with the 3D structure in response to a combination of the aligned first and second images.

7. The method in accordance with claim 6 wherein the determining if the facial image is consistent with a 3D structure further comprises filtering light from the first image which is not illumination of the first color.

8. The method in accordance with claim 6 wherein the determining if the facial image is consistent with a 3D structure further comprises filtering light from the second image which is not illumination of the second color.

9. The method in accordance with claim 1 wherein the acquiring the first image and the acquiring the second image comprise acquiring a first set of images, the first set of images comprising the first image and the second image, the method further comprising acquiring at least a further set of images including:

acquiring a first one of the further set of images of the facial image illuminated with a third color different from the first and second colors; and acquiring a second one of the further set of images of the facial image illuminated with a fourth color, wherein the fourth color is different from the first, second and third colors, and wherein the third color and the fourth color are selected in response to chrominance differential between a chrominance value of the third color and a chrominance value of the fourth color, and wherein the determining if the facial image is consistent with the 3D structure comprises determining if the facial image is consistent with a 3D structure in response to a combination of the first, second, third and fourth images.

10. A system in a device for liveness detection authentication of a facial image, the system comprising:

a multi-color illumination device for providing illumination in a first direction;

a camera for acquiring images in at least the first direction a memory for storing data, wherein the stored data comprises a stored image of a user to be authenticated; and a processor coupled to the multi-color illumination device and the camera, the processor recording a first image from the camera when the multi-color illumination device illuminates the facial image with a first color and recording a second image from the camera when the multi-color illumination device illuminates the facial image with a second color, the processor analyzing a combination of the first and second images to determine if the facial image is consistent with a three-dimensional (3D) structure in response to a combination of the first and second images, the processor determining if the facial image matches the user to be authenticated by comparing the combination of the first and second images to the stored image of the user to be authenticated, the processor authenticating the facial image if the facial image is consistent with the 3D structure and the facial image matches a face of the user to be authenticated.

11. The system in accordance with claim 10 wherein the processor controls the multi-color illumination device to illuminate the face with the first color and the second color in response to selecting the first and second colors to maximize a chrominance differential between chrominance values of the first and second colors.

12. The system in accordance with claim 10 wherein the processor controls the multi-color illumination device to illuminate the face with the first color for a first time and controls the multi-color illumination device to illuminate the face with the second color for a second time, wherein the first time and the second time a randomly chosen by the processor.

13. The system in accordance with claim 10 wherein the multi-color illumination device comprises a display and wherein the processor provides reference marker information to the display to suggest the user adjust a position of the camera before the acquiring the first image in response to determining that the facial image and the lighting are not correct.

14. The system in accordance with claim 13 wherein the reference marker information comprises an image of the user.

15. The system in accordance with claim 13 wherein the processor moves the reference marker information on the display to suggest the user adjust a position of the camera by maintaining a position of the reference marker substantially in a center of the display.

16. The system in accordance with claim 10 wherein the processor determines the facial image is consistent with the 3D structure by aligning the first image and the second image and determining if the facial image is consistent with the 3D structure in response to a combination of the aligned first and second images.

17. The system in accordance with claim 16 wherein determining the facial image is consistent with a 3D structure further comprises filtering light from the first image which is not illumination of the first color.

18. The system in accordance with claim 16 wherein determining the facial image is consistent with a 3D structure further comprises filtering light from the second image which is not illumination of the second color.

19. The system in accordance with claim 10 wherein the device comprises a mobile phone.

20. A non-transitory computer readable media for performing liveness detection authentication of a facial image, the computer readable medium storing instructions for a processor to acquire a first image of the facial image illuminated with a first color;

acquire a second image of the facial image illuminated with a second color;

determine if the facial image is consistent with a three-dimensional (3D) structure in response to a combination of the first and second images determine if the facial image matches a user to be authenticated by comparing a combination of the first and second images to an image of the user to be authenticated, the image of the user to be authenticated being stored in a memory; and authenticate the facial image if the facial image is consistent with the 3D structure and the facial image matches a face of the user to be authenticated.

21. The computer readable medium in accordance with claim 20 further storing instructions for the processor to provide visual instructions to suggest the user to adjust position of the camera before acquiring the first image in response to determining that the facial image and the lighting are not correct.

22. The computer readable medium in accordance with claim 20 further storing instructions for the processor to determine the facial image is consistent with the 3D structure in response to aligning the first image and the second image.

23. The computer readable medium in accordance with claim 20 further storing instructions for the processor to determine the facial image is consistent with the 3D structure in response to filtering light from the first image which is not illumination of the first color.

24. The computer readable medium in accordance with claim 20 wherein the determining if the facial image is consistent with a 3D structure further comprises filtering light from the second image which is not illumination of the second color.

* * * * *